United States Patent [19]

Leiter

[11] Patent Number: 4,676,118
[45] Date of Patent: Jun. 30, 1987

[54] SPEED CHANGE MECHANISM FOR A BICYCLE

[75] Inventor: Berndt Leiter, Waigolshausen, Fed. Rep. of Germany

[73] Assignee: Ets. Huret et ses Fils, Nanterre, France

[21] Appl. No.: 789,074

[22] Filed: Oct. 18, 1985

[30] Foreign Application Priority Data

Oct. 20, 1984 [DE] Fed. Rep. of Germany ....... 3438535

[51] Int. Cl.$^4$ .................. G05G 5/06; B62K 23/06
[52] U.S. Cl. .................................. 74/475; 74/527; 474/82
[58] Field of Search ............. 74/475, 527, 531, 502.2, 74/82

[56] References Cited

U.S. PATENT DOCUMENTS

| 3,406,587 | 10/1968 | Brilando et al. | 74/475 |
| 3,570,325 | 3/1971 | Kroll et al. | 74/527 |
| 3,915,029 | 10/1975 | Shimada | 74/531 |
| 4,191,065 | 3/1980 | Golobay et al. | 74/527 |
| 4,267,744 | 5/1981 | Yamasaki | 74/475 |
| 4,270,481 | 6/1981 | Watarai | 74/475 |
| 4,279,172 | 7/1981 | Nagano et al. | 474/82 |
| 4,403,977 | 9/1983 | Bergles | 74/475 |
| 4,454,784 | 6/1984 | Shimano | 74/475 |
| 4,503,958 | 3/1985 | Nishio | 74/475 |
| 4,548,092 | 10/1985 | Strong, Jr. | 74/475 |

FOREIGN PATENT DOCUMENTS

| 2940841 | 4/1981 | Fed. Rep. of Germany . |
| 3013771 | 10/1981 | Fed. Rep. of Germany . |
| 2017838 | 3/1979 | United Kingdom . |

Primary Examiner—Cornelius J. Husar
Assistant Examiner—Peter M. Cuomo
Attorney, Agent, or Firm—Toren, McGeady & Associates

[57] ABSTRACT

The invention relates to a gear-change device for derailleurs or gear-change hubs in which by enlargement of at least one of the provided detents in the circumferential direction and by arrangement of a spring which biases the change lever in the one direction an easy adjustability is provided by an adjusting screw. Furthermore the exchanging of detent discs for easy adaptation to different gear ratio numbers is easily possible. The assembly of the gear changer is easy to effect in as much as two component groups can be prefitted independently of one another. A shift-over device for one direction, as utilized advantageously especially in derailleurs, can easily be integrated.

25 Claims, 9 Drawing Figures

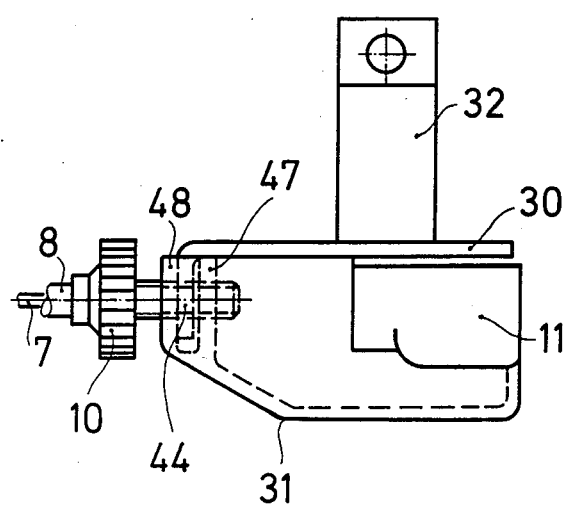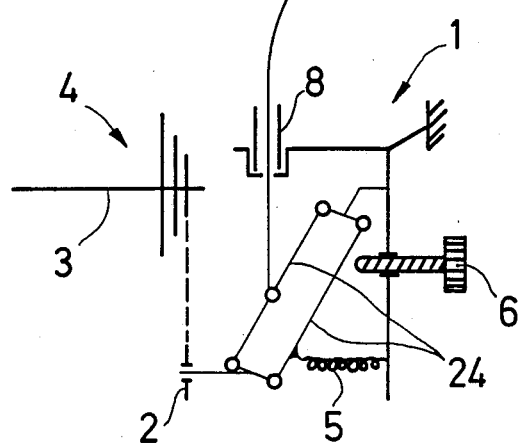

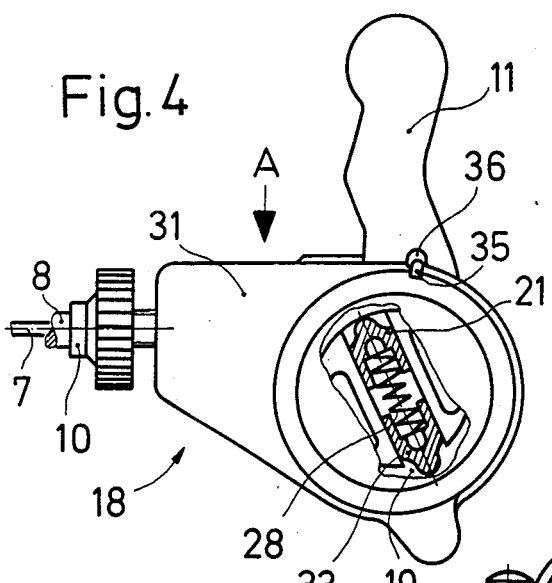
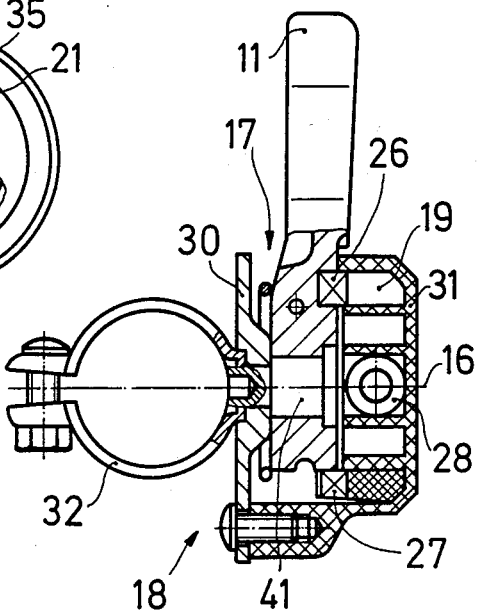
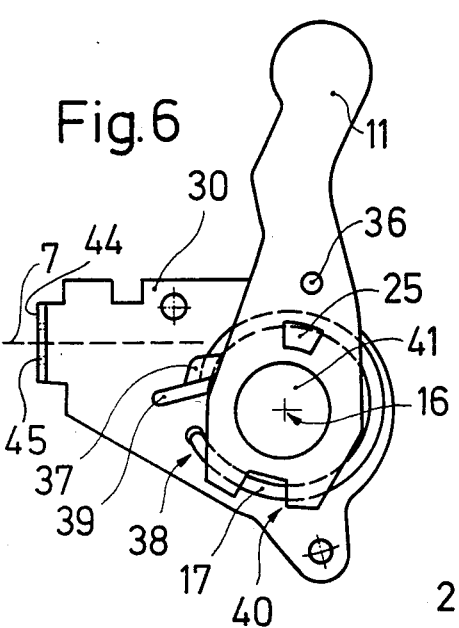
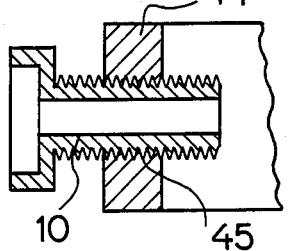
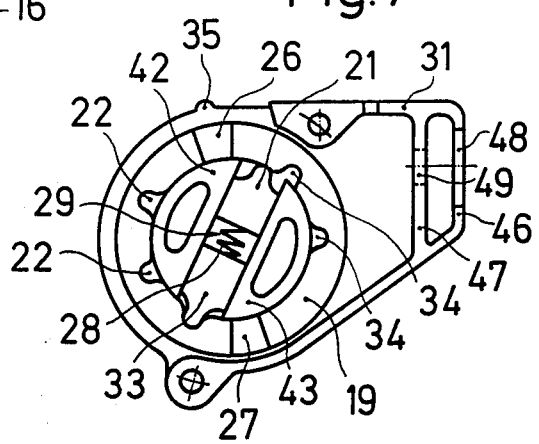

SPEED CHANGE MECHANISM FOR A BICYCLE

BACKGROUND OF THE INVENTION

This invention relates to a gear-change device, especially for cycles, consisting inter alia of a gearing co-operating with the driven wheel and actuable by means of a Bowden cable which acts on the gearing side upon a spring-loaded actuating element, this spring endeavouring to shift the gearing into the one end position against the tension of the Bowden cable, while a stop for the actuating element is provided in this end position. Further provided is a gear-changer with change lever which is mounted pivotably about a pivot spindle in a fixedly arranged housing. The Bowden cable enters with its end remote from the gear into the housing. A detent device is provided between the housing and the change lever, with detent means for each gear ratio.

STATEMENT OF THE PRIOR ART

Gear-change devices of this kind are known from the prior art. Thus by way of example from German 'Offenlegungsschrift' No. 30 13 771 a change lever for a derailleur is known which comprises a detent device and possesses a shift-over device. This change lever here acts upon a derailleur which is loaded by a spring into its one end position.

Apart from the expense of construction of this known gear-change mechanism an exact setting of the Bowden cable is necessary before the commencement of cooperation. Furthermore for example from German 'Offenlegungsschrift' No. 29 40 841 a gear-change hub is known in which the gearing is likewise loaded by a spring into its one end position and in which again the adjustment of the Bowden cable in relation to the change device must be carried out exactly.

OBJECT OF THE INVENTION

It is the problem of the present invention to produce a gear-change device especially for cycles which is as universally usable as possible, which renders possible a simple and logical adjustment of the Bowden cable and which furthermore is as adaptable as possible to different kinds of gears and to different numbers of gear ratios.

SUMMARY OF THE INVENTION

A speed-change mechanism for a bicycle or the like comprises an actuating element movably into a plurality of actuating element positions corresponding to different gear ratios, one of said actuating element positions being a basic actuating element position. Abutment means define said basic actuating element position. Actuating element biasing means bias said actuating element towards said basic actuating element position. A gear-changer unit has a gear changer housing and a change lever which is mounted pivotably about a pivot spindle within said gear changer housing. The change lever is movable in a plurality of change lever positions corresponding to said actuating element positions. One of said change lever positions is a basic change lever position and corresponds to said basic actuating element position. A Bowden cable has a Bowden tube and a Bowden wire. The Bowden tube is supported at a first end thereof on a first Bowden tube support member stationary with respect to said bicycle and by a second end thereof on a second Bowden tube support member on said gear changer housing. The Bowden wire is connected with a first end thereof with said actuating element and with a second end thereof with said change lever. The actuating element is movable into various actuating element positions through said Bowden cable against the action of said actuating element biasing means by moving said change lever into corresponding change lever positions. A detent system includes a plurality of detent means corresponding to said change lever positions for maintaining said change lever in a desired change lever position. The detent system grants to said change lever a play about said spindle with respect to said basic change lever position when said actuating element is in said basic actuating element position. Change lever biasing means act onto said change lever when said actuating element is in said basic actuating element position such as to keep said Bowden wire under tension. The change lever biasing means act with spring force smaller than the spring force of said actuating element biasing means onto said Bowden wire. Indicating means indicate the entrance of said change lever into its basic change lever position. Bowden cable adjustment means are provided for adjusting said change lever within the range of said play into said basic change lever position while said actuating element remains in said basic actuating element position.

The various features of novelty which characterize the invention are pointed out with particularlity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail below by reference to examples of embodiment, where individually FIG. 1 shows the representation of principle of a derailleur with change lever and Bowden cable;

FIGS. 4 and 5 show an elevation and longitudinal section of a gear-change device;

FIGS. 6 and 7 show an elevation of the two parts of an opened gear-change device;

FIG. 6a shows a cross-sectional detail of an adjusting screw threaded in a tap portion; and FIG. 8 shows a partial elevation of a gear-change device according to FIG. 4.

DETAIL DESCRIPTION OF THE DRAWINGS

Figure 2:
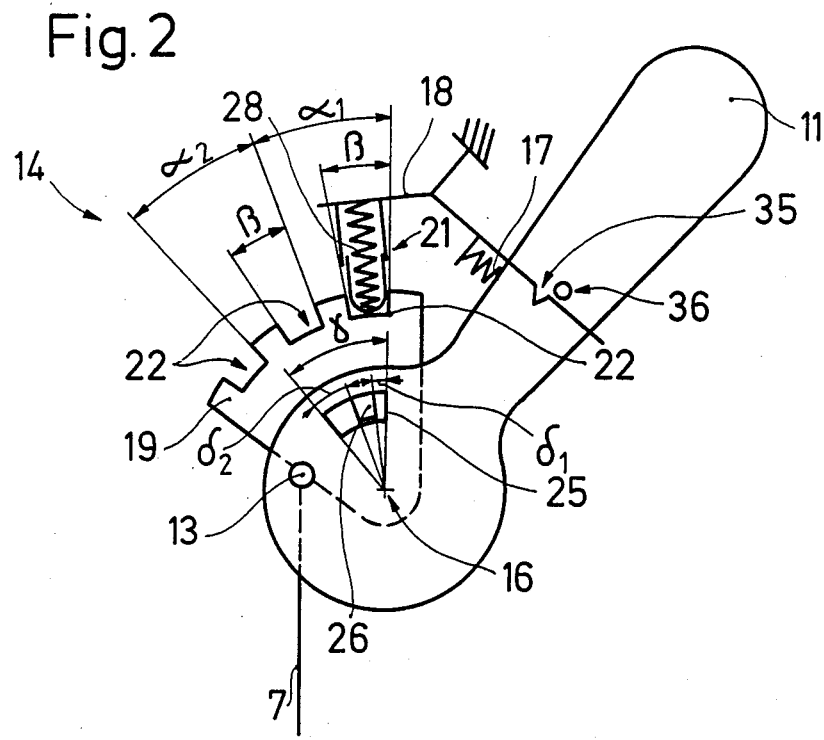
FIG. 2 shows a gear-change lever with detent device especially for use in derailleurs.

FIG. 1 shows the representation of principle of a gear-change device with a change mechanism 1 conforming with a derailleur. The change lever 11, 12 is arranged rotatably in a changer and firmly connected with the one end of a Bowden cable 7. The sheath or tube 8 of the Bowden cable is supported fast with the frame through an adjusting screw 10. The other end of the sheath 8 likewise is supported fast with the frame in the region of the change mechanism 1. The Bowden cable 7 is arranged for example on the parallelogram links 24. These parallelogram links 24 are on the one hand arranged pivotably on a frame and on the other hand carry the guide wheel 2. Over this guide wheel 2 the chain runs to the toothed wheel set 4 on the spindle 3 of the driven wheel. The parallelogram links 24 are loaded by a spring 5 in their one pivot direction, this direction of loading corresponding to the smallest toothed wheel of the toothed wheel set 4. When the Bowden cable 7 is not attached or on actuation of the change lever 11, 12 in the corresponding direction, the parallelogram links 24 move under the force of the spring 5 in the direction towards a stop screw 6 with which the exact setting of the change mechanism 1 in relation to the smallest toothed wheel of the toothed wheel set 4 is fixed. Starting from this basic position, then by appropriate actuation of the change lever 11,12 the gear change mechansim 1 can be pivoted by means of the parallelogram links 24 so that the guide wheel 2 can transfer the chain on to each of the larger toothed wheels of the toothed wheel set 4. At this point it should be indicated that a gear-change hub, as mentioned by way of example in the prior art, is in principle assembled in just the same way as the change mechanism 1 as regards the loading of the change mechanism by a spring, which transfers the change mechanism into the one end position if the Bowden cable 7 is slack. The exact setting of the Bowden cable 7 in first assembly of a change mechanism or after removal of the rear wheel will now be explained in greater detail by reference to the descriptions of FIGS. 2 and 3.

FIG. 2 shows a detent device 14 in connection with a change lever 11 such as can be used in a gear-change device according to FIG. 1. The change lever 11 is mounted pivotably about a pivot spindle 16 which is secured for example to a handle bar or a frame tube of a cycle. Moreover a detent disc 19 is likewise rotatably mounted on this pivot spindle 16. The detent disc 19 comprises a plurality of detents 22 distributed on its external circumference. These detents 22 co-operate with a spring-loaded detent pin 21 which is arranged on a housing 18 fast with the frame and is loaded by a spring 28 in the direction towards the detents 22. The detent pin 21 and the detents 22 are of such design here that on appropriate introduction of force through the change lever 11 the detent pin 21 is lifted out of its respective detent and can then engage in the next. The detents 22 correspond with the detent pin 21 substantially without play in the circumferential direction. Thus each of the detents 22 has a detent width corresponding to the angle $\beta$. The individual gear change distances between the detents 22 are designated in the present case by $\beta_1$ and $\beta_2$. These intervals can be equal, but they can also be of different sizes taking consideration of the corresponding necessary displacement distances in the gear-change mechanism 1. The nipple 13 of the Bowden cable 7 is attached to the change lever 11. A drag connection is provided between the change lever 11 and the detent disc 19. This drag connection can be constituted in principle by an opening 25 in the change lever 11 and by an engaging member 26 of the detent disc 19. The engaging member 26 here has a smaller extent in the circumferential direction than does the opening 25.

In the illustration the circumferential width of the opening 25 is fixed at $\gamma$ and the play between engaging member 26 and opening 25, provided according to the illustration, is of the size of $\delta_1+\delta_2$. Furthermore a spring 17 is provided between the housing 18 of the gear-change device and the change lever 11, which spring loads the change lever 11 according to the illustration in the clockwise direction and acts against the traction force of the spring 5 of the change mechanism 1. The spring 5 of the change mechanism 1 is here considerably stronger than the spring 17. Thus at the moment the spring 17 can only ensure that the Bowden cable 7 and the sheath 8 are arranged without play in their anchorages. Furthermore according to FIG. 2 a marking 36 is arranged on the change lever 11 and can be displaced with respect to a marking 35 provided on the housing 18.

The setting and the function of the change device are as follows: Starting from the first asembly of the change device as illustrated according to FIGS. 1 and 2, let it be assumed that the selected length of Bowden cable 7 and sheath 8 and the momentary setting of the adjusting screw 10 have the consequence that on exact setting of the stop screw 6 according to the smallest toothed wheel of the toothed wheel set 4, the change lever 11 is held by the spring 17 in relation to the detent disc 19 taking its position corresponding to the smallest toothed wheel, so that the engaging member 26 is situated with respect to the opening 25 in a middle position. This middle position is characterised in that starting from the engaging member 26 in the clockwise direction there is a gap $\delta_1$ from the opening 25 and in the opposite direction of rotation there is a gap $\delta_2$. In this position of change lever and detent disc in relation to the housing 18 the two markings 35 and 36 are likewise displaced by the angle $\delta_1$. A satisfactory, rapid and simple basic setting of the entire gear-change device is now achieved in that by means of the adjusting screw 10 the play of the magnitude $\delta_1$ between the opening 25 of the change lever 11 and the engaging member 26 of the detent disc 19 is brought practically to the value 0.

A displacement of the adjusting screw 10 becomes directly visible by the mutual movment of the two markings 35 and 36, since the spring 17 loads the change lever against the force of the spring 5 of the change mechanism 1, so that the Bowden cable 7 is held without play with a slight traction force. Starting from the position assumed at random in FIG. 2, during assembly, now by unscrewing of the adjusting screw 10 out of its corresponding threading an artificial shortening of the Bowder cable 7 can be effected, whereby the change lever 11 is pivoted in the counter-clockwise direction and the play $\delta_1$ is reduced. To the same extent the marking 36 of the change lever 11 moves towards the marking 35 of the housing 18. On coincidence of the two markings 35 and 36 the play $\delta_1$ is cancelled and the correct operational adjustment is effected. On a subsequent actuation of the change lever 11 this firstly travels the shirt-over distance of the magnitude $\delta_1+\delta_2$ with simultaneously pivoting out of the change mechanism 1 in the direction towards the next larger toothed wheel and only after the taking up of this shiftover distance of magnitude $\delta_1+\delta_2$ does the entraining of the detent disc 19 take place. On a rotation of the detent disc 19 by the amount $\alpha_1$, that is from one detent 22 to the next detent 22, a pivoting in the direction towards the next toothed wheel is communicated to the change mechansim 1, which pivoting is greater by the amount $\delta_1+\delta_2$ than the exact shift distance from the smallest to the next larger toothed wheel. So the transfer of the change to the subsubsequent larger toothed wheel is facilitated. After liberation of the change lever 11, after the change operation has been effected, the force of the spring 5 of the change mechanism 1 effects a pivoting back of the change lever 11 by the amount $\delta_1+\delta_2$ so that due to the traction force of the spring 5 the change lever rests with its opening 25 on the engaging member 26. In this operational position the gear ratio concerned is engaged exactly. On a change operation from a larger to a smaller toothed wheel this shift-over distance is not realised it is also not necessary in this change direction. The spring 17 is here designed so that it is effective only in the changing range between the smallest and the next larger toothed wheels.

The change device can be set also only in this position and also only in this range are the markings 35 and 36 to be brought into coincidence. At this point it should be mentioned yet again that before the adjustment by means of the adjusting screw 10 the stop screw 6 of the change mechanism 1 must be adjusted according to the smallest toothed wheel.

Figure 3:
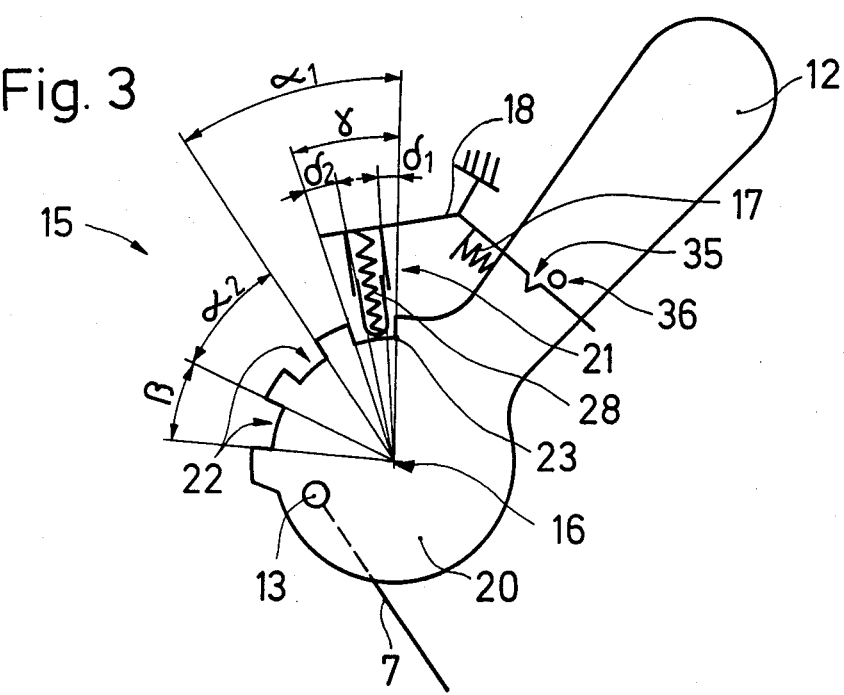
FIG. 3 shows a change lever with detent device especially for use with a gear-change hub.

A change device in combination with a gear-change hub will now be explained in greater detail by reference to FIG. 3. Since in the case of a gear-change hub a shift-over distance is not necessary, a drag connection 25, 26 according to FIG. 2 can be omitted. This can firstly have the consequence that the change lever according to FIG. 3 is integrally provided with the detents 22 and 23. It is also possible to combine a universally usuable changer 11 with a separate detent disc according to FIG. 2 which is interchangeable and equipped with detents corresponding to the respective number of gear ratios. In this case the detent disc must be connected fast in rotation with the change lever, for example in the form of an opening 25 and an engaging member 26, but without play in the circumferential direction, as necessary in FIG. 2 for the realisation of a shift-over distance for a derailleur. FIG. 3 now shows a change lever 12 which is mounted pivotably about a pivot spindle 16. The change lever 12 is firmly connected with a detent disc 20 which directly carries the detents 22 and 23. These detents correspond with a spring-loaded detent pin 21 which is secured to a non-displaceable housing 18 and is loaded by a spring 28 in the direction towards the detents. Furthermore a spring 17 which loads the change lever 12 in the clockwise direction is arranged on the housing 18. A Bowden cable 7 is hooked by means of a nipple 13 to the change lever 12. It is subjected to traction stress on actuation of the change lever 12 in the clockwise direction. Provided that the detent device 15 is just described is connected with a gear-change hub in which likewise the one end position of the gear-change parts is determined by a spring and by a fixed stop and this spring is stronger than the spring 17, the following adjustment and change operation results:

The detent 23 according to FIG. 3, corresponding to the speed which is defined in the gear-change hub by a fixed stop and by a biasing spring, has an angular width of the size $\gamma$, which is larger than the angular width of the other detents 22 of size $\beta$. Here the individual speed distances are fixed for example $\alpha_1$ and $\alpha_2$ and can be equal. On initial assembly of the gear-change device let the basis be adopted that the Bowden cable 7 utilised, with the sheath 8 and the adjusting screw 10, due to the spring loading of the spring 17, result in a position according to FIG. 3. This position is characterised in that the free distances $\delta_1$ and $\delta_2$ are present between the detent pin 21 and the circumferential end limitations of the detent 23. For the achievement of the exact setting of the Bowden cable 7 now an artificial shortening of the Bowden cable 7 is brought about by screwing of the adjusting screw 10 out of its threading, whereby the play $\delta_1$ can be cancelled against the force of the spring 17. A check on this cancellation of play results from the observation of the markings 35 and 36 on the change lever 12 and on the housing 18 respectively. If the two markings 35 and 36 are opposite to one another, the play $\delta_1$ is cancelled and the adjustment of the detent device 15 with respect to the hub is satisfactory. On the subsequent actuation of the change lever 12 in the clockwise direction firstly the diminution of the play $_1+_2$ and then the snapping of the detent pin 21 out of the detent 23 take place. After the travelling through the angel $\alpha_1$ the detent pin 21 can snap into the next detent 22 and is fixed there without play in the circumferential direction. The enlarged formation of the detent 23 in the direction towards the next detent 22 is thus provided only for simple adjustment of the Bowden cable 7. The adjustment can take lace only in this first detent 23 which is larger than the other detents 22 and corresponds to the gear ratio which has a fixed stop in the gear-change hub.

Forms of embodiment of the complete gear-change device will be explained in greater detail below in FIGS. 4 to 8. FIGS. 4 and 5 show an elevation and a partial longitudinal section of a gear-change device. The device consists of a base plate 30 which is firmly connected with a clip 32. On the side remote from the clip 32 the base plate 30 has a bearing journal 41 on which the change lever 11 is rotatably mounted. The adjusting screw 10 is guided in a threading on the base plate 30. The change device is closed to the exterior by a lid 31. In this lid the detent disc 19 is mounted rotatably, namely about the same pivot spindle 16 as the change lever 11, and the two detent pins 21 and 33 are combined with their spring 28. All components firmly connected with the clip 32 are regarded as the housing 18. The entraining of the detent disc 19 by the change lever 11 takes place through engaging members 26 and 27, and the more detailed explanation of the function of these components takes place with reference to FIGS. 6 and 7. The spring 17, which likewise will be described in greater detail below, is arranged in the axial direction between the base plate 30 and the change lever 11. The opened change device is represented in FIGS. 6 and 7, in each case with a view towards the mutually facing sides of the two component groups. The one group consists of the base plate 30 with bearing journal 41, change lever 11 and spring 17, and the other group consists of the lid 31 with the detent disc 19, the two detent pins 21 and 33 and the common spring 28. FIG. 6 shows the one component group, from which the arrangement of the spring 17 may also be seen. This is hooked with its one end 38 in a corresponding opening of the base plate 30, and loops around the bearing journal 41 with spacing, through about 360°. The other end 39 of the spring 17 protrudes somewhat radially outwards and acts on a nose 37 of the change lever 11. However the end 39 is so long that outside the gear position according to FIGS. 2 and 3 it comes to abut on the inner wall of the lid 31 and thus the spring is no longer effective in the other gear ratios.

On the base plate 30 there is provided an axially protruding tab 44 with a threaded opening 45 for the reception of the adjusting screw 10. The entry of the Bowden cable 7 is represented in chain lines. The marking 36 for the adjustment may be seen on the change lever 11. The change lever 11 has two approximately mutually diametrically oppositely arranged openings 25 and 40 which constitute the connection between change lever 11 and detent device 14. This appears especially from FIG. 7. FIG. 7 shows the removed lid 31, which is pivoted through 180° compared with FIG. 4. In its interior the lid 31 guides the detent disc 19. This is mounted rotatably on two circle segments 42 and 43 and the detent disc 19 is guided with its regions arranged between the radially inwardly open detents 22 and 34 on the circle segments 42 and 43. Between them the two circle segments 42 and 43 form a radially extending guide 29 for the guidance of the two detent pins 21 and 33. The two detent pins 21 and 33 are loaded away from one another in the direction towards the detents 22 and 34 by a common compression spring 28. The detent disc 19 is provided with two axially protruding engaging members 26 and 27 which engage in the openings 25 and 40 of the change lever 11. According to FIG. 2 this engagement can be formed with a play in the circumferential direction for obtaining a shift-over behaviour, as described above, but this engagement can be made without play in the circumferential direction, so that a gear-change hub can be actuated with it. Then the functioin is in principle in conformity with FIG. 3. The detents 22 co-operate with the detent pin 33 and the detents 34 with the detent pin 21. Here the detents 22 and 34 are distributed over the circumference of the detent disc 19 in such a way that in changing in one direction the detent pins 21 and 33 come successively into engagement in alternation. In this way even on a small circumference the detents can be arranged precisely with adequate spacing from one another. Furthermore the fitting of the two detent pins is substantially simplified, since these merely have to be inserted axially into the already inserted detent disc 19.

The lid 31 further comprises two walls 46 and 47 of parallel course in which the tab 44 of the base plate 30 engages in assembly. The wall 46 is here provided with an axially open opening 48 which renders possible the subsequent passage of the adjusting screw 10. The wall 47 is provided with a bore 49 in which the threading of the adjusting screw 10 is inserted so tightly that self-locking occurs. The situation of the fitted change device can be represented easily with the aid of FIG. 8. The lid 31 pre-fitted with the detent disc 19 and the detent pins 21 and 33 is pushed in the axial direction on to the base plate 30. For this purpose the change lever 11 is brought preferably into the position corresponding to the smallest toothed wheel according to FIG. 1. In that case the tab 44 of the base plate 30 engages between the two walls 47 and 48 and thus constitutes a fixing between lid 31 and base plate 30. A further fixing anywhere on the circumference of the two parts is advantageously provided. By screwing of the adjusting screw 10 into the threading 45 of the tab 44 and into the bore 49 of the wall 47 the two parts are connected with one another so that they cannot be lost. A further securing point approximately diametrically opposite to the tab 44 may be provided in the form of one or two screws, but it is also possible to provide a hook-in device to be actuated first, and then to introduce the tab 44 between the two walls 46 and 47.

The possible form of embodiment of a change device according to FIGS. 4 to 8 possesses the following advantages: The entry of the Bowden cable 7 with the sheath 8 takes place close and parallel to the handlebar (clip 32). The change device itself is universally usable for derailleurs and hub gear-changes and can be converted to different numbers of ratios by variation of few parts. For this purpose it is only necessary to replace the detent disc 19.

The individual parts of the change device are easily pre-fittable, as for example the base plate 30 with the change lever 11 and the looping spring 17 for the one part and the lid 31 with the complete detent device for the other. The adjusting of the draw cable is effected by means of an externally easily visible marking merely by rotation of the adjusting screw 10. The gear change can be realised with or without shift-over behaviour. The shift distances between the individual gear positions can be made relatively small, though the detents in the detent disc are made with large intervals.

It is to be noted that on adjustment of the adjusting screw 10 the change lever 11 immediately follows due to the presence of the spring 17.

While specific embodiments of the invention have been shown and described in detail to illustrate the application of the inventive principle, it will be understood that the invention may be embodied otherwise without departing from such principles.

It is to be noted that the reference numbers in the claims are only provided in view of facilitating the understanding of the claims. These reference numbers are by no means to be understood as restrictive.

What is claimed is:

1. A speed-change mechanism for a bicycle or the like comprising:
   an actuating element (2) movably into a plurality of actuating element positions corresponding to different gear ratios, one of said actuating element positions being a basic actuating element position;
   abutment means (6) defining said basic actuating element position;
   actuating element biasing means (5) biasing said actuating element (2) towards said basic actuating element position;
   a gear changer unit (18, 11) having a gear changer housing (18) and a change lever (11) which is mounted pivotably about a pivot spindle (16) within said gear changer housing (18), said change lever (11) being movable in a plurality of change lever positions corresponding to said actuating element positions, one of said change lever positions being a basic change lever position and corresponding to said basic actuating element position;
   a Bowden cable (7, 8) having a Bowden tube (8) and a Bowden wire (7), said Bowden tube (8) being supported at a first end thereof on a first Bowden tube support member stationary with respect to said bicycle and by a second end thereof on a second Bowden tube support member (10) on said gear changer housing (18), said Bowden wire (7) being connected with a first end thereof with said actuating element (2) and with a second end thereof with said change lever (11), said actuating element (2) being movable into various actuating element positions through said Bowden cable (7, 8) against the action of said actuating element biasing means (5) by moving said change lever (11) into corresponding change lever positions;
   a detent system (14) with a plurality of detent means (21, 22) corresponding to said change lever positions for maintaining said change lever (11) in a desired change lever position;
   said detent system (14) including at least one spring-loaded detent element (21) stationary with respect to the gear change housing (18) and a plurality of detents (22) on a detent member (19) which is movable with said change lever (11) substantially through the complete plurality of change lever positions;

said detent system (14) granting to said change lever (11) a play about said spindle (16) with respect to said basic change lever positions when said actuating element (2) is in said basic actuating element position;

change lever biasing means (17) acting onto said change lever (11) in a pivoting sense about said pivot spindle when said actuating element (2) is in said basic actuating element position such as to keep said Bowden wire (7) under tension in using said play granted to said change lever (11), said change lever biasing means (17) acting with a spring force smaller than the spring force of said actuating element biasing means (5) onto said Bowden wire (7);

indicating means (35, 36) indicating the entrance of said change lever (11) into its basic change lever position;

Bowden cable adjustment means (10) for adjusting said change lever (11) within the range of said play into said basic change lever position while said actuating element (2) remains in said basic actuating element position.

2. A speed-changer mechanism as set forth in claim 1, wherein said change lever biasing means (17) act onto said change lever (11) only within a partial range of the range of movement of said change lever (11), said partial range being adjacent said basic change lever position.

3. A speed-changer mechanism as set forth in claim 2, wherein said change lever biasing means (17) act onto said change lever (11) only within said play and within a partial range of movement (alpha 1) extending between the basic change lever position and an immediately adjacent change lever position.

4. A speed-changer mechanism as set forth in claim 1, wherein said detent element (21) comprises at least one spring-loaded detent pin (21) stationary with respect to the gear changer housing (18), said detent member comprises a detent disc with the plurality of detents (22) on said detent disc (19) being movable by said change lever (11).

5. A speed-changer mechanism as set forth in claim 4, wherein said detent disc (19) and said change lever (11) are separate parts and are both pivotably mounted about said pivot spindle (16).

6. A speed-changer mechanism as set forth in claim 5, especially for use in connection with a derailleur system, wherein a drag connection (25, 26) is provided between said change lever (11) and said detent disc (19), said drag connection (25, 26) requiring an increased movement of said change lever (11) as compared with the angular distance (alpha 1) between two subsequent change lever positions in a direction corresponding to the transport of a chain from a smaller to a larger chain sprocket.

7. A speed-changer mechanism as set forth in claim 6, wherein said play granted to said change lever (11) is obtained by said drag connection (25, 26).

8. A speed-changer mechanism as set forth in claim 4, wherein said play granted to said change lever (12) of said detent system (15) is based on a detent (23) of said detent disc (20) corresponding to said basic change lever position, which detent (23) has an angular width exceeding the angular width of said spring-loaded detent pin (21).

9. A speed-changer mechanism as set forth in claim 1, wherein said indicating means are based on feeling the adjusting resistance of said Bowden cable adjustment means (10), said increase of adjusting resistance resulting from said play being consumed as a result of adjustment.

10. A speed-changer mechanism as set forth in claim 1, wherein said Bowden cable adjustment means (10) are based on said second Bowden tube support member (10) being adjustable with respect to said gear changer housing (18).

11. A speed-changer mechanism as set forth in claim 1, wherein said gear changer housing (18) comprises a base plate (30) which is provided with a tube clip (32) for being clipped to a tube member of the respective bicycle and further comprises said pivot spindle (41) on which the change lever (11) is rotatably mounted.

12. A speed-changer mechanism as set forth in claim 11, wherein said change lever biasing means comprise a looping spring (17) surrounding said pivot spindle (41) and located between said base plate and said change lever (11), one end (38) of said looping spring (17) being fixed with respect to said base plate (30) and the other end (39) of said looping spring (17) acting onto said change lever (11).

13. A speed-changer mechanism as set forth in claim 12, wherein said other end (39) of said looping spring (17) cooperates with an abutment on said gear changer housing (18) such as to limit the action of said looping spring (17) to a part of the range of movement of said change lever (11).

14. A speed-changer mechanism as set forth in claim 12, wherein a sub-unit comprising said base plate (30), said looping spring (17) and said change lever (11) are covered by a lid (31) containing the detent system.

15. A speed-changer mechanism as set forth in claim 14, wherein said detent system comprises an annular detent disc (19) rotatably mounted in said lid (31) about an axis coinciding with an axis of said pivot spindle (41), said annular detent disc (19) having radially inward open detents (23, 34), at least one detent pin (21, 33) being radially guided in radially extending guide means (42, 43) of said lid (31), said detent pin (21, 33) being radially biased by detent pin biasing means (28) towards engagement with said annular detent disc (19), said annular detent disc (19) being coupled with said change lever (11) by torque transmitting means (26, 27, 25, 17).

16. A speed-changer mechanism as set forth in claim 15, wherein said annular detent disc (19) and said detent pin (21, 33) are arranged in a plane parallel to a plane containing said change lever (11) and said torque transmitting means (26, 27, 25, 17) comprise at least one axially extending engaging member (26, 27) engaging in a corresponding opening (25, 27) of said change lever (11).

17. A speed-changer mechanism as set forth in claim 16, wherein said play granted by said detent system is provided by said opening (25, 17) being larger in circumferential direction about said pivot spindle (41) as compared with said engaging member (26, 27)

18. A speed-changer mechanism as set forth in claim 15, wherein two detent pins (21, 33) are provided within said guide means (42, 43) and biased in opposite radial directions by said detent pin biasing means (28), each of said detent pins (21, 33) cooperating with said detents (22, 34), in at least some of said change lever positions only one of said detent pins (21, 33) being in engagement with one of said detents (22, 34).

19. A speed-changer mechanism as set forth in claim 15, said detent disc (19) being rotatably mounted within said lid (31) on circle segments (42, 43) which define said guide means between them.

20. A speed-changer mechanism as set forth in claim 19, wherein said circle segments (42, 43) are integral with said lid (31).

21. A speed-changer mechanism as set forth in claim 14, said lid (31) covering part of said change lever (11), said change lever biasing means (17) and said base plate (30) and being positioned and fixed with respect to said base plate (30).

22. A speed-changer mechanism as set forth in claim 21, said base plate comprising a tab (44) integral therewith and extending substantially parallel to said pivot spindle (41), said tab (44) having a threaded bore (45) therethrough and receiving a threaded tube portion of said second Bowden tube support member (10), said tab portion (44) being received between two adjacent wall portions (46, 47), namely an outer wall portion (46) and an inner wall portion (47) of said lid (31) said outer wall portion (46) being provided with a recess (48) receiving said tube portion when positioning said lid (31) on said base plate (30), said inner wall portion (47) having a bore (49) therethrough for receiving said tube portion in response to screwing said tube portion with respect to said threaded bore (45) such that said tube portion forms at least part of fixing means fixing said lid (31) on said base plate (30).

23. A speed-changer mechanism as set forth in claim 1, wherein said abutment means (6) are adjustable.

24. A speed-changer mechanism as set forth in claim 1, wherein said indicating means (35, 36) are visible indicating means.

25. A speed-changer mechanism as set forth in claim 1, wherein said detent system is exchangeable in adaptation to various speed numbers and/or to different kinds of speed-change gears.

* * * * *